US012723880B2

(12) United States Patent
Deusch et al.

(10) Patent No.: US 12,723,880 B2
(45) Date of Patent: Sep. 1, 2026

(54) METHOD FOR REPLANNING A PARKING PATH

(71) Applicant: Continental Autonomous Mobility Germany GmbH, Ingolstadt (DE)

(72) Inventors: Hendrik Deusch, Wiesbaden-Bierstadt (DE); Yong-Ho Yoo, Kelkheim (DE)

(73) Assignee: AUMOVIO Autonomous Mobility Germany GmbH, Ingolstadt (DE)

( * ) Notice: Subject to any disclaimer, the term of this patent is extended or adjusted under 35 U.S.C. 154(b) by 2 days.

(21) Appl. No.: 18/574,029

(22) PCT Filed: Jun. 21, 2022

(86) PCT No.: PCT/DE2022/200137
§ 371 (c)(1),
(2) Date: Dec. 24, 2023

(87) PCT Pub. No.: WO2023/274468
PCT Pub. Date: Jan. 5, 2023

(65) Prior Publication Data

US 2024/0369366 A1 Nov. 7, 2024

(30) Foreign Application Priority Data

Jun. 29, 2021 (DE) ..................... 10 2021 206 708.5

(51) Int. Cl.
*G01C 21/34* (2006.01)

(52) U.S. Cl.
CPC ................................ *G01C 21/3415* (2013.01)

(58) Field of Classification Search
CPC .............. G01C 21/3415; B60W 30/06; B62D 15/0285
See application file for complete search history.

(56) References Cited

U.S. PATENT DOCUMENTS

2010/0049402 A1 2/2010 Tanaka
2017/0032681 A1 2/2017 Tomozawa et al.

FOREIGN PATENT DOCUMENTS

CN 101641241 A 2/2010
CN 102019928 A 4/2011
CN 104395946 A 3/2015
CN 106536314 A 3/2017
DE 102010001288 A1 7/2011
DE 102018220328 A1 5/2020
JP 2001018821 A 1/2001
JP 2003205809 A 7/2003
JP 2009083806 A 4/2009
JP 2010034645 A 2/2010

OTHER PUBLICATIONS

Machine Translation DE 102018220328 (Year: 2020).*
(Continued)

*Primary Examiner* — Anne Marie Antonucci

(57) ABSTRACT

A method is disclosed for replanning a parking trajectory of a vehicle during an at least semiautomatic parallel parking process following the reception of information that a pre-planned parking trajectory for the parallel parking process has to be replanned.

15 Claims, 3 Drawing Sheets

(56) References Cited

OTHER PUBLICATIONS

German Office Action dated Apr. 8, 2022 for the priority German Patent Application No. 10 2021 206 708.5 and translation of same.
The International Search Report and the Written Opinion of the International Searching Authority mailed on Oct. 14, 2022 for the PCT Application No. PCT/DE2022/200137 for which this application claims priority.
German Notice of Allowance dated Feb. 1, 2023 for the priority German Patent Application No. 10 2021 206 708.5 and translation of same.
Dmiti Dolgov et al., "Practical Search Techniques in Path Planning for Autonomous Driving," Proceedings of the First International Symposium on Search Techniques in Artificial Intelligence and Robotics (STAIR-08). Jun. 2008, https://www.researchgate.net/publication/238518488_Practical_Search_Techniques_in_Path_Planning_for_Autonomous_Driving.
Yoshiaki Kuwata et al., "Real-time Motion Planning with Applications to Autonomous Urban Driving", IEEE Transactions on Control Systems Technology, vol. 17, Issue: 5, Sep. 2009, pp. 1105-1118, DOI: 10.1109/TCST.2008.2012116.
Notice of Reasons for Refusal mailed on Oct. 23, 2024 for the counterpart Japanese Patent Application No. 2023-575437 and machine translation of same.
Korean Office Action dated Feb. 10, 2025 for the Korean Patent Application No. 10 2023 7042239 and machine translation of same.
Chinese Office Action dated Feb. 28, 2026 for the counterpart Chinese Patent Application No. 202280044008.0 and machine translation of same.
Korean Office Action dated Oct. 1, 2026 for the counterpart Korean Patent Application No. 10 2023 7042239 1 × and machine translation of same.

* cited by examiner

METHOD FOR REPLANNING A PARKING PATH

CROSS-REFERENCE TO RELATED APPLICATIONS

The present application is a National Stage Application under 35 U.S.C. § 371 of International Patent Application No. PCT/DE2022/200137 filed on Jun. 21, 2022, and claims priority from German Patent Application No. 10 2021 206 708.5 filed on Jun. 29, 2021 in the German Patent and Trademark Office, the disclosures of which are herein incorporated by reference in their entireties.

TECHNICAL FIELD

The invention relates to a method for replanning a parking trajectory for parking processes which are performed at least partially automatically.

BACKGROUND

Methods for rule-based or geometric planning of a parking trajectory for specific parking situations are known from the prior art. In addition, generic trajectory planners which make it possible to plan trajectories more freely have already become known.

In parking assistance systems, the trajectory planner should have the capacity to react dynamically to changes in the environmental model, i.e., during the parking process which has already been started. Such changes in the environmental model can, for example, occur due to newly detected objects in the surrounding area (e.g., due to the small range of the detecting sensor technology, due to more accurate detection thanks to the lower speed of the vehicle during parking, etc.) or due to a change in the parking situation (e.g., the parking space is larger or smaller than during the original planning of the parking process). As a result, it can happen that the originally planned parking trajectory is invalid due to the changes in the detection of the surroundings and the automated parking process is therefore aborted.

It is true that generic trajectory planners can deal with changes in the detections of the surroundings, but they frequently do not generate parking trajectories expected by the human driver and, in addition, have a high computational complexity.

SUMMARY

Proceeding herefrom, it is an object of the present disclosure to indicate a method for replanning a parking trajectory which can react dynamically to a changed parking situation, has a high level of user acceptance, and requires limited computing capacity.

The object is addressed by a method having the features of the independent Claim 1. Example embodiments are the subject-matter of the subclaims. A system for replanning a parking trajectory of a vehicle is the subject-matter of the alternative, independent Claim 15.

According to a first aspect, the present disclosure relates to a method for replanning a parking trajectory of a vehicle during an at least semiautomatic parallel parking process. The method includes the following steps.

Information is initially received that a pre-planned parking trajectory for the parallel parking process has to be replanned. The information can be provided, for example, by a component of a driver assistance system of the vehicle, for example by that component which generates the environmental model of the area surrounding the vehicle.

A target position of the vehicle is subsequently received. The target position may be identical to the previous target position or may be a new target position, i.e., the new target position differs from a previous target position which should have been taken up by the formerly performed parking process. Cases in which the target position remains the same may, for example, change the environmental model in such a way that the originally planned trajectory may no longer be traveled in a collision-free manner or may be an unexpected deviation from the rules, i.e., the vehicle leaves the planned parking trajectory in an undesirable manner.

Thereupon, a multi-movement parking trajectory is newly planned based on the target position by means of a first planning method. Starting from the current position of the vehicle, the new planning of the parking trajectory includes lengthening or shortening an S-shaped parking movement up to a first intermediate position at which the vehicle is still a safe distance from a surrounding object. Starting from the first intermediate position, an individual parking movement or one or more forward/backward parking movements is/are planned in order to position the vehicle on the target position or on a target area around the target position.

Alternatively or additionally, a multi-movement parking trajectory is newly planned based on the target position by means of a second planning method. In the case of the second planning method, starting from the target position, an individual parking movement or one or more forward/backward parking movements to a second intermediate position is/are planned, at which the vehicle is still a safe distance from a surrounding object. Starting from the second intermediate position, an S-shaped parking movement or a parking movement including a circular arc and a clothoid to the current position of the vehicle is planned. An "S-shaped parking movement" is understood to mean a parking movement which has both a section curved to the right and a section curved to the left.

Finally, it is verified whether the new planning by means of the first and/or the second planning method allowed an admissible new parking trajectory between the current vehicle position and the target position of the vehicle within specified planning limits.

The technical advantage of the method according to present disclosure is that the method makes it possible to replan the parking trajectory without having to abort the parking process altogether and, thanks to specified planning strategies, makes it possible to replan the parking trajectory, in a flexible manner, to an alternative parking trajectory which is perceived as natural by the human driver, with limited computational cost.

According to an example embodiment, the first or the second planning method is carried out depending on the result of a decision step. That is to say that it is verified in advance whether the first planning method could lead to an admissible parking trajectory and, depending on the result of the verification, the first planning method is only performed if the latter seems to be promising. Alternatively, the first planning method is initially performed and if no admissible parking trajectory could be attained within specified planning limits by the first planning method, the second planning method is performed. That is to say that in the case of the second alternative, there is no preliminary verification, but an attempt is made directly to obtain an admissible parking trajectory with the first planning method.

According to an example embodiment, in the event that no admissible parking trajectory could be attained within specified planning limits by the second planning method, a third planning method is performed. This means that if both the first planning method, which is either conducted directly or in a verification step, the suitability of which for determining a valid parking trajectory is ascertained, and the second planning method are unable to determine an admissible parking trajectory, recourse is had to the third planning method. As a result, a planning hierarchy is specified, which makes it possible to obtain a reaction, which is adapted to the specific situation, to different parking situations with reduced computing effort.

According to an example embodiment, the third planning method uses a first intermediate position and a second intermediate position. The first intermediate position is reached by lengthening or shortening an S-shaped parking movement, starting from the current position of the vehicle, wherein the vehicle is still a safe distance from a surrounding object at the first intermediate position. Starting from the target position, the second intermediate position is reached by planning an individual parking movement or one or more forward/backward parking movements, wherein the vehicle is still a safe distance from a surrounding object at the second intermediate position. The first intermediate position may be identical to the first intermediate position determined by the first planning method. The second intermediate position may be identical to the second intermediate position determined by the second planning method.

According to an example embodiment, the third planning method determines a partial parking trajectory between the first and second intermediate position. The partial parking trajectory has a first and a second partial parking trajectory section. The first partial parking trajectory section connects the first or second intermediate position to a third intermediate position located outside of or in the direction of the edge of the parking space and the second partial parking trajectory section connects the third intermediate position to the second or the first intermediate position.

According to an example embodiment, the third planning method determines a parking trajectory which, starting from the current position of the vehicle, includes a first partial parking trajectory to the first intermediate position, a second partial parking trajectory having a first partial parking trajectory section from the first intermediate position to the third intermediate position and a second partial parking trajectory section from the third intermediate position to the second intermediate position and at least one third partial parking trajectory from the second intermediate position to the target position of the vehicle. The third intermediate position may be selected in such a way that, viewed in the transverse direction of the parking space, it lies outside of or in the direction of the edge of the parking space, such as in an entrance area of the parking space, via which the vehicle was initially maneuvered into the parking space.

According to an example embodiment, the first partial parking trajectory section of the second partial parking trajectory begins at that intermediate position from the set of the first and second intermediate positions, which, viewed in the transverse direction of the parking space, lies less deeply in the parking space. The result of this is that the vehicle may be moved out of the parking space again more easily in a collision-free manner thanks to the second partial parking trajectory.

According to an example embodiment, the first partial parking trajectory section of the second partial parking trajectory includes a circular segment and a straight line. In other words, the first partial parking trajectory section merely has a section with a curvature to the left or a curvature to the right. A clothoid may be provided, which connects the circular segment to the straight line. Alternatively, the first partial parking trajectory section of the second partial parking trajectory is designed in the shape of an S, i.e., it has both a section curved to the left and a section curved to the right. The first partial parking trajectory section of the second partial parking trajectory is in particular designed in the shape of an S if the first and second intermediate positions are merely a very small distance from one another.

According to an example embodiment, the first or second partial parking trajectory section has a circular segment by means of which the present vehicle alignment at the first intermediate position is adapted relative to the vehicle alignment at the second intermediate position or the present vehicle alignment at the second intermediate position is adapted relative to the vehicle alignment at the first intermediate position. Adapting the vehicle alignment may make trajectory planning easier.

According to an example embodiment, in the event that no admissible new parking trajectory could be determined within specified planning limits in the third planning method, replanning is initiated by means of the third planning method, wherein the first partial parking trajectory section has a circular segment adjoining the first intermediate position and the second partial parking trajectory section has a circular segment adjoining the second intermediate position, by means of which the vehicle alignments are adapted synchronously to one another. The circular segments allow a change in the vehicle alignment. The vehicle alignment may be changed in such a way that the vehicle is turned with the front in the direction of the parking space opening, via which the parking space is driven into. This creates a new initial situation in order to achieve a collision-free partial parking trajectory between the first and the second intermediate position by the third planning method.

According to an example embodiment, the current position of the vehicle is a position at which the vehicle is located while progressively moving on the pre-planned parking trajectory for the parallel parking process for a specified period of time which is estimated for the calculation of the new parking trajectory. As a result, the fact may already be taken into consideration during the planning of the trajectory that the vehicle position still changes due to the continued parking process on the parking trajectory previously calculated for the parking situation which is no longer valid.

According to an example embodiment, the new parking trajectory constantly follows the pre-planned parking trajectory for the parallel parking process in terms of the position and the curvature. This can be achieved via a clothoid, for example. As a result, a smooth transition between the old and the new parking trajectory may be achieved.

According to an example embodiment, the planning limits includes a maximum permitted number of parking movements and/or a tolerable deviation of the target position, which may be reached by the newly planned parking trajectory, from the specified target position. These planning limits may be used to establish when the respective planning process is to be aborted.

According to an example embodiment, the S-shaped parking movement includes at least one circular arc, at least one clothoid and/or at least one straight line. A parking trajectory may be created by these segments, which makes it possible to maneuver the vehicle smoothly along the parking trajectory.

According to a further aspect, the present disclosure relates to a system for replanning a parking trajectory of a vehicle during an at least semiautomatic parallel parking process, including a computing unit. The computing unit is configured to carry out the following steps of:

- receiving information that a pre-planned parking trajectory for the parallel parking process has to be replanned;
- receiving a target position of the vehicle;
- newly planning a multi-movement parking trajectory based on the target position by means of a first planning method, wherein, starting from the current position of the vehicle, the new planning of the parking trajectory includes lengthening or shortening an S-shaped parking movement up to a first intermediate position, at which the vehicle is still a safe distance from a surrounding object and, starting from the first intermediate position, planning one parking movement or one or more forward/backward parking movements in order to position the vehicle on the target position or on a target area around the target position; and/or
- newly planning a multi-movement parking trajectory based on the target position by means of a second planning method, wherein, starting from the target position, the new planning of the parking trajectory has the planning of one parking movement or one or more forward/backward parking movements to a second intermediate position, at which the vehicle is still a safe distance from a surrounding object and, starting from the second intermediate position, includes the planning of an S-shaped parking movement or a parking movement including a circular arc and a clothoid to the current position of the vehicle;
- verifying whether the new planning by means of the first and/or the second planning method allowed an admissible new parking trajectory between the current vehicle position and the target position of the vehicle within specified planning limits.

Further developments, advantages and possible applications of the present disclosure are set out by the following description of example embodiments and the figures. All of the features described and/or illustrated are fundamentally the subject-matter of the present disclosure, either alone or in any combination, regardless of how they are summarized in the claims or how they relate back to them. The content of the claims is also made part of the description.

BRIEF DESCRIPTION OF THE DRAWINGS

The invention is explained in more detail below with reference to the figures of exemplary embodiments, wherein.

DETAILED DESCRIPTION

The present disclosure relates to a method for replanning a parking trajectory of a vehicle after a parallel parking process performed by a parking assistance system has been started. The trigger for the replanning may be automatically produced by a computer unit of the vehicle, for example if it is recognized by the sensor technology of the vehicle that the parking situation has changed. Such a change in the parking situation exists, for example, when the parking space which is to be parked in by means of the parallel parking process has increased or decreased.

Figure 1:
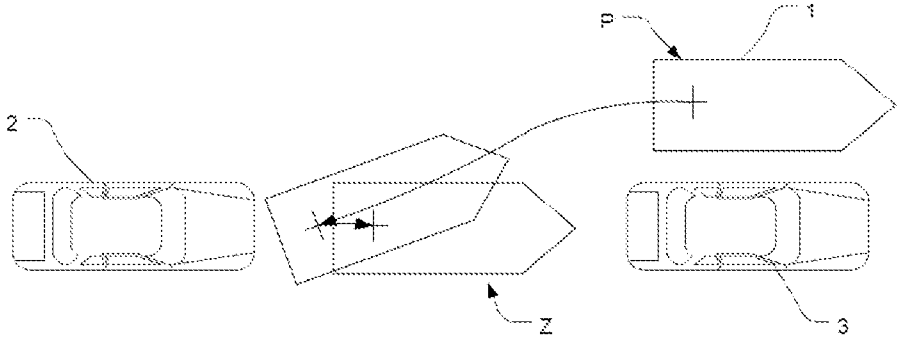
FIG. 1 shows, by way of example, a schematic representation of a sideways/parallel parking process according to an originally planned parking trajectory.

FIG. 1 shows, by way of example, the originally planned trajectory of a parking process, in which the vehicle 1 initially reverses into the parking space by means of a first parking movement on an S-shaped parking trajectory and is subsequently maneuvered in the forward direction to the target position Z by means of a second parking movement. This is a parking process which is performed at least semiautomatically, i.e., the parking assistance system at least partially takes over control of the vehicle 1.

Figure 2:
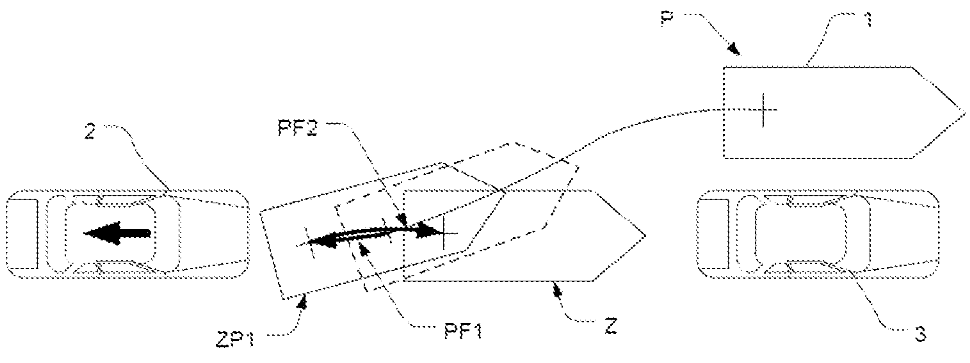
FIG. 2 shows, by way of example, a schematic representation of a parking trajectory of a sideways/parallel parking process, which is planned according to a first planning method, during a parking situation which has changed compared with the parking situation according to FIG. 1.

FIG. 2 shows a parking situation which has changed compared with FIG. 1, in which the parking space between the surrounding objects 2, 3 has increased, for example in that one of the surrounding objects 2, 3 has moved, as indicated as a surrounding object 2 for the vehicle by the arrow. However, the change in the parking situation can also be that the parking space between the surrounding objects 2, 3 has decreased.

Due to the change in the parking situation, the information is received by a computing unit of the vehicle that it is necessary to replan the parking trajectory planned for the parallel parking process. In addition, a target position Z is received, at which the vehicle 1 is to be located following the end of the parking process to be newly planned.

Following the reception of the target position Z, an attempt may be initially made to take up the target position Z by means of a first trajectory planning method. Initially, the partial trajectory of the S-shaped parking movement of the parking trajectory originally planned for the parking process is lengthened or shortened, depending on whether the parking space has increased or decreased and inasmuch as the vehicle 1 is moved into the parking space so far that a specified safe distance from the surrounding object 2, in particular the rear surrounding object 2, is only just observed. In the example embodiment according to FIG. 2, this is indicated by arrow PF1. As a result, the vehicle 1 is moved to the intermediate position ZP1 which differs from the position according to FIG. 1, at which the change in travel direction should take place according to the originally planned parking process (this position is drawn in dashed lines in FIG. 2).

Starting from this first intermediate position ZP1, a further parking movement, in the present case a forward parking movement according to arrow PF2, or one or more forward/backward parking movements is/are subsequently planned in order to move the vehicle 1 from the first intermediate position ZP1 to the target position Z. When planning the further parking movement, an attempt is made to maneuver the vehicle 1 from the first intermediate position ZP1 to the target position Z or a target area around the target position Z while observing specified planning limits. The planning limits may be, for example, the maximum number of forward/backward parking movements or an upper limit for the deviation of the vehicle position, which may actually be reached, from the target position.

If these planning limits cannot be observed and, therefore, no admissible parking trajectory may be reached by the first planning method, an attempt is made to determine an admissible parking trajectory by a second planning method.

Alternatively, in the event that it may already be recognized due to the detected parking situation that the first planning method is not productive, the first planning method may also be directly omitted and the second planning method described below may be carried out.

Figure 3:
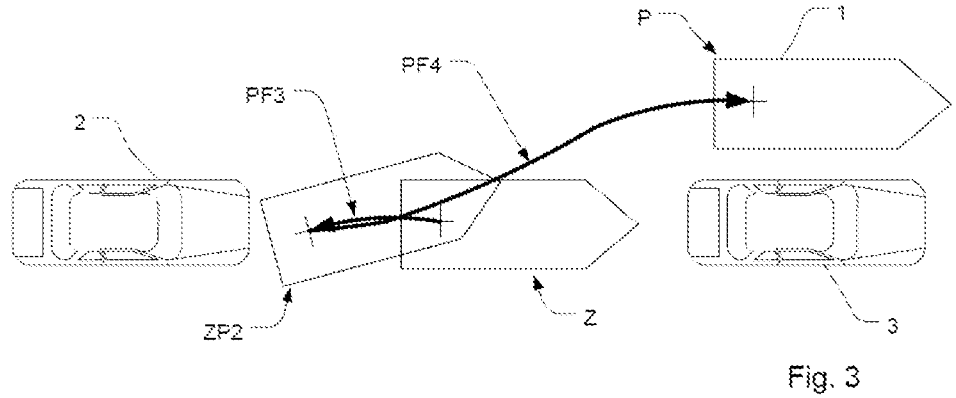
FIG. 3 shows, by way of example, a schematic representation of a parking trajectory of a sideways/parallel parking process, which is planned according to a second planning method, to the changed parking situation according to FIG. 2.

FIG. 3 shows, by way of example and schematically, the procedures of the second planning method. The parking trajectory is not planned in the actual chronological sequence of the parking process, i.e., starting from the current vehicle position P toward the target position Z, but rather vice versa, and indeed starting from the target position Z toward the current vehicle position P.

In the case of the second planning method, an attempt is made to determine a parking trajectory, by means of which the vehicle 1 may be initially maneuvered from the target position Z to a second intermediate position ZP2 (arrow PF3) and from the second intermediate position ZP2 to the current vehicle position P (arrow PF4) by means of a parking movement. The second intermediate position ZP2 is a position in which the vehicle 1 is still a predefined safe distance away from a surrounding object 2, in particular a surrounding object 2 delimiting the rear of the parking space. Starting from the target position Z, reaching the second intermediate position ZP2 may be planned either by a single parking movement, for example a backward parking movement, or one or more forward/backward parking movements.

In this case, it should be noted that the second intermediate position ZP2 is typically a different position from the first intermediate position ZP1 according to the first planning method.

The current vehicle position P may be that position at which the vehicle 1 is located when it receives the information that a replanning process is required, or it may be a notional position along the originally planned parking trajectory, at which the vehicle will be located after performing the parking trajectory calculation up to the determination of an admissible new parking trajectory.

If it was not possible to determine an admissible new parking trajectory by the second planning method either, while observing specified planning limits, a third planning method may be utilized. The third planning method is based, for example, on the first and second intermediate positions ZP1, ZP2 and attempts to connect the first and second intermediate positions ZP1, ZP2 via a parking trajectory located therebetween.

Figure 4:
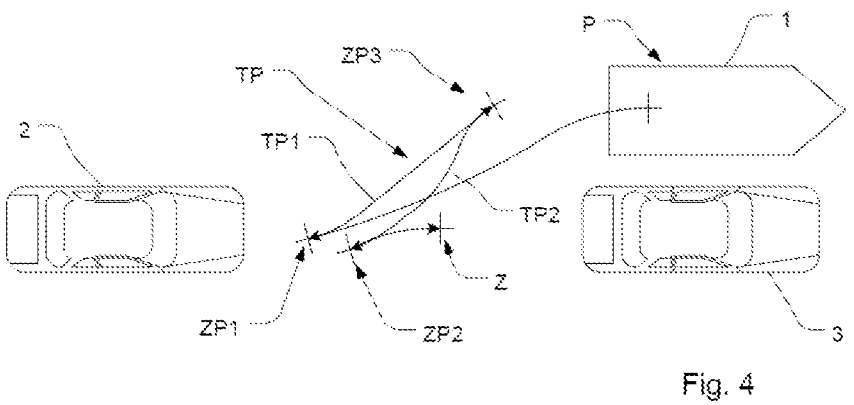
FIG. 4 shows, by way of example, a schematic representation of a parking trajectory of a sideways/parallel parking process, which is planned according to a third planning method, to the changed parking situation according to FIG. 2.

FIG. 4 shows, by way of example and schematically, a multi-movement parking trajectory which is planned according to the third planning method, in which the vehicle 1 is maneuvered, starting from the current position P, via a first intermediate position ZP1, a third intermediate position ZP3 and a second intermediate position ZP2 toward the target position Z.

The first intermediate position ZP1 and the second intermediate position ZP2 may be determined in the same way as explained above in connection with the first and second planning methods (FIGS. 2 and 3). This means that the first intermediate position ZP1 is obtained by lengthening or shortening the parking trajectory originally planned for the parking process, with a safe distance from the surrounding object 2 being observed. The second intermediate position ZP2 is obtained by moving the vehicle 1 backwards, starting from the target position Z, in such a way that a safe distance from a surrounding object, for example the surrounding object 2, may only just be observed. As previously noted, the first and second intermediate positions ZP1, ZP2 are different positions. The intermediate positions ZP1, ZP2 determined in the first and second planning methods and the partial parking trajectories for how to reach these intermediate positions ZP1, ZP2 are advantageously reused in the case of the third planning method.

Since it is not possible to either maneuver the vehicle 1 from the current position P via the first intermediate position ZP1 to the target position Z, or from the target position Z via the second intermediate position ZP2 to the current position P of the vehicle 1 according to the first and second planning methods, a multi-movement partial parking trajectory TP between the first and second intermediate positions ZP1, ZP2 is determined in the third planning method, by means of which multi-movement partial parking trajectory the vehicle 1 is at least partially moved out of the parking space again in a first partial parking trajectory section TP1 in order to subsequently move it into the parking space again in a second partial parking trajectory section TP2.

As is obvious from FIG. 4, starting at the first intermediate position ZP1, the vehicle 1 is therefore moved away from the second intermediate position ZP2 by the first partial parking trajectory section TP1, in order to subsequently move the vehicle 1 to the second intermediate position ZP2 by means of the second partial parking trajectory section TP2.

During the planning of the multi-movement partial parking trajectory TP, it is initially verified whether the first or the second intermediate position ZP1, ZP2 lies more deeply in the parking space, i.e., which intermediate position, viewed in the transverse direction of the parking space, is the smaller distance from the edge of the parking space, from which the parking space was driven into. In the present case, this is the first intermediate position ZP1. The multi-step partial parking trajectory TP is planned in such a way that the vehicle 1 is moved out of the parking space from that intermediate position which, viewed in the transverse direction of the vehicle 1, lies least deeply in the parking space.

Prior to ascertaining which of the intermediate positions ZP1, ZP2 lies more deeply in the parking space, the angular alignment of the vehicle 1 (i.e., the yaw angle) may be adapted, so that the same vehicle alignment may be assumed in each case during the planning of the partial parking trajectory TP. To this end, starting from the first or the second intermediate position ZP1, ZP2, a circular segment may be initially planned, by means of which the vehicle alignment is adapted relative to the vehicle alignment at the second intermediate position ZP2, or vice versa, in the area of the first intermediate position ZP1. By adjusting the vehicle alignment, a modified intermediate position is obtained through the free end of the circular segment, by means of which the alignment is adjusted, based on which the comparison as to which intermediate position lies more deeply in the parking space is carried out, i.e., the modified intermediate position is compared with that intermediate position to which the vehicle alignment was adjusted.

The first partial parking trajectory section TP1, by means of which the vehicle is moved out of the parking space again, may have at least one circular arc, at least one clothoid and/or at least one straight line. The first partial parking trajectory section TP1 may have a straight line which ends at the third intermediate position ZP3. This applies in particular when the first and second intermediate positions ZP1, ZP2 have a sufficient distance. In an alternative variant, the first partial parking trajectory section TP1 may also be designed as an S-shaped curve.

The second partial parking trajectory section TP2 may be designed as an S-curve, i.e., has an area curved to the right and an area curved to the left, in order to thereby move the vehicle from the third intermediate position ZP3 to the second intermediate position ZP2.

The curvature may be adapted by means of a clothoid between trajectory areas having a different curvature, for example a transition from a circular segment to a straight line. The clothoid is selected in such a way that there is a constant transition in curvature and, therefore, it is possible to drive through the parking trajectory smoothly.

If the planning of the parking trajectory with the third planning method likewise fails under the specified planning limits, the vehicle alignment in the area of the first and second intermediate positions ZP1, ZP2 is changed synchronously, i.e., in the same direction and by the same amount. This may take place following the relative adaptation of the vehicle alignment, i.e., after the vehicle alignment, as previously described, has been adapted in the area of the first intermediate position ZP1 by a circular segment relative to the vehicle alignment at the second intermediate position ZP2, or vice versa. The change is made by synchronously adapting the vehicle alignment in the area of both intermediate positions ZP1, ZP2 in such a way that the yaw angle is increased in the direction of the entrance opening to the parking space, i.e., the vehicle 1 is pivoted out of the parking space in order to avoid a collision with the surrounding objects 2, 3. The synchronous pivoting takes place, for example, by means of circular segments.

Starting from the free ends of the circular segments, trajectory planning is subsequently initiated again in order to determine a multi-movement partial parking trajectory TP with a first and a second partial parking trajectory section TP1, TP2, by means of which the vehicle may be maneuvered from the first intermediate position ZP1 via a third intermediate position ZP3 to the second intermediate position ZP2.

Figure 5:
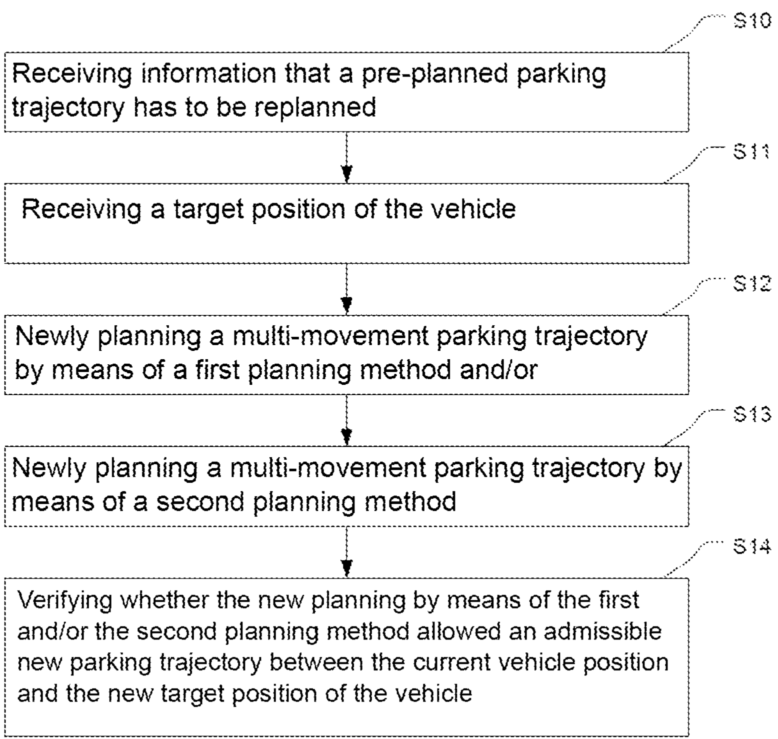
FIG. 5 shows, by way of example, a block diagram which illustrates the steps of the method for replanning the parking trajectory.

FIG. 5 shows a schematic block diagram which illustrates the procedures of the method for replanning the parking trajectory during an at least semiautomatic parallel parking process.

Information is initially received that a pre-planned parking trajectory for the parallel parking process has to be replanned (S10). The information may be provided by any component of the vehicle 1, for example from a component, by means of which an environmental model is generated.

A target position of the vehicle is subsequently received, at which the vehicle is to be placed after carrying out the parking process (S11).

Based on the target position, a multi-movement parking trajectory is replanned by means of a first planning method. When replanning the parking trajectory with the first planning method, an S-shaped parking movement is lengthened or shortened, starting from the current position of the vehicle, up to a first intermediate position, the vehicle still being a safe distance from a surrounding object at the first intermediate position. Starting from the first intermediate position, an individual parking movement or one or more forward/backward parking movements is/are planned in order to position the vehicle on the target position or on a target area around the target position (S12).

Alternatively or additionally, a multi-movement parking trajectory is replanned based on the target position by means of a second planning method. Starting from the target position, an individual parking movement or one or more forward/backward parking movements is/are planned to a second intermediate position at which the vehicle is still a safe distance from a surrounding object. Starting from the second intermediate position, an S-shaped parking movement or a parking movement including a circular arc and a clothoid to the current position of the vehicle is planned (S13). The replanning of the parking trajectory with the second planning method may then be carried out if the planning of the parking trajectory with the first planning method was not successful.

Finally, it is verified whether the new planning by means of the first and/or the second planning method allowed an admissible new parking trajectory between the current vehicle position and the target position of the vehicle within specified planning limits (S14).

The invention has been described above by means of example embodiments. It goes without saying that numerous changes and modifications are possible without leaving the scope of protection defined by the claims.

LIST OF REFERENCE NUMERALS

1 Vehicle
2 Surrounding object
3 Surrounding object
P Current vehicle position
PF1 Arrow
PF2 Arrow
PF3 Arrow
PF4 Arrow
Z Target position
ZP1 First target position
ZP2 Second target position
ZP3 Third target position

The invention claimed is:

1. A method for replanning a parking trajectory of a vehicle during an at least semiautomatic parallel parking process, wherein the method comprises:

receiving, by a computer unit, information that a pre-planned parking trajectory for the parallel parking process has to be replanned;

receiving, by the computer unit, a target position of the vehicle;

performing at least one of newly planning, by the computer unit, a multi-movement parking trajectory based on the target position by means of a first planning method, wherein, starting from a current position of the vehicle, the new planning of the parking trajectory comprises lengthening or shortening an S-shaped parking movement up to a first intermediate position, at which the vehicle is still a safe distance from a surrounding object and, starting from the first intermediate position, planning an individual parking movement or one or more forward/backward parking movements in order to position the vehicle on the target position or on a target area around the target position; or newly planning, by the computer unit, a multi-movement parking trajectory based on the target position by a second planning method, wherein, starting from the target position, the new planning of the parking trajectory comprises planning, by the computer unit, an individual parking movement or one or more forward/backward parking movements to a second intermediate position, at which the vehicle is still a safe distance from a surrounding object and, starting from the second intermediate position, comprises planning, by the computer unit an S-shaped parking movement or a parking movement comprising a circular arc and a clothoid to the current position of the vehicle;

verifying, by the computer unit, whether the new planning by the at least one of the first or the second planning method allowed an admissible new parking trajectory between the current vehicle position and the target position of the vehicle within specified parking limits; and controlling the vehicle to operate according to the admissible new parking trajectory.

2. The method according to claim 1, wherein the first or the second planning method is carried out depending on a result of a decision step or that the first planning method is initially performed and in the event that no admissible parking trajectory could be attained within specified planning limits by the first planning method, the second planning method is performed.

3. The method according to claim 1, wherein in the event that no admissible parking trajectory could be attained within specified planning limits by the second planning method, a third planning method is performed.

4. The method according to claim 3, wherein the third planning method uses a first intermediate position and a second intermediate position, wherein the first intermediate position is reached by lengthening or shortening an S-shaped parking movement, starting from the current position of the vehicle, and the vehicle is still a safe distance from a surrounding object at the first intermediate position, and wherein the second intermediate position is reached by planning an individual parking movement or one or more forward/backward parking movements, starting from the target position, and the vehicle is still a safe distance from a surrounding object at the second intermediate position.

5. The method according to claim 4, wherein the third planning method determines a partial parking trajectory between the first and second intermediate positions which has a first partial parking trajectory section and a second partial parking trajectory section, wherein the first partial parking trajectory section connects the first or second intermediate position to a third intermediate position located outside of or in a direction of an edge of a parking space and the second partial parking trajectory section connects the third intermediate position to the second intermediate position or the first intermediate position.

6. The method according to claims 5, wherein the first partial parking trajectory section of the second partial parking trajectory comprises a circular segment and a straight line or that the first partial parking trajectory section of the second partial parking trajectory is S-shaped.

7. The method according to claim 5, wherein the first or second partial parking trajectory section has a circular segment by which a present vehicle alignment at the first intermediate position is adapted relative to a vehicle alignment at the second intermediate position or the present vehicle alignment at the second intermediate position is adapted relative to the vehicle alignment at the first intermediate position.

8. The method according to claim 5, wherein, in the event that no admissible new parking trajectory could be determined within specified planning limits in the third planning method, replanning is initiated of the third planning method, wherein the first partial parking trajectory section has a circular segment adjoining the first intermediate position and the second partial parking trajectory section has a circular segment adjoining the second intermediate position, by which vehicle alignments are adapted synchronously to one another.

9. The method according to claim 4, wherein the third planning method determines a parking trajectory which, starting from the current position of the vehicle, comprises a first partial parking trajectory to the first intermediate position, a second partial parking trajectory having a first partial parking trajectory section from the first intermediate position to the third intermediate position and a second partial parking trajectory section from the third intermediate position to the second intermediate position and at least one third partial parking trajectory from the second intermediate position to the target position of the vehicle.

10. The method according to claim 9, wherein the first partial parking trajectory section of the second partial parking trajectory begins at that intermediate position from a set of the first and second intermediate positions, which, viewed in a transverse direction of a parking space, lies less deeply in the parking space.

11. The method according to claim 1, wherein the current position of the vehicle is a position at which the vehicle is located while progressively moving on the pre-planned parking trajectory for the parallel parking process for a specified period of time which is estimated for the calculation of the new parking trajectory.

12. The method according to claim 1, wherein the new parking trajectory constantly follows the pre-planned parking trajectory for the parallel parking process in terms of the position and curvature.

13. The method according claim 1, wherein the planning limits comprise a maximum permitted number of parking movements and/or a tolerable-deviation of the target position, which can be reached by the newly planned parking trajectory, from the specified target position.

14. The method according to claim 1, wherein the S-shaped parking movement comprises a circular arc, a clothoid and/or a straight line.

15. A system for replanning a parking trajectory of a vehicle during an at least semiautomatic parallel parking process, comprising a computing unit, wherein the computing unit is configured to carry out a method comprising:

receiving information that a pre-planned parking trajectory for the parallel parking process has to be replanned;

receiving a target position of the vehicle;

performing at least one of newly planning a multi-movement parking trajectory based on the target position by a first planning method, wherein, starting from a current position of the vehicle, the new planning of the parking trajectory comprises lengthening or shortening an S-shaped parking movement up to a first intermediate position, at which the vehicle is still a safe distance from a surrounding object and, starting from the first intermediate position, planning one parking movement or one or more forward/ backward parking movements in order to position the vehicle on the target position or on a target area around the target position; or newly planning a multi-movement parking trajectory based on the target position by a second planning method, wherein the new planning of the parking trajectory, starting from the target position, comprises planning one parking movement or one or more forward/backward parking movements to a second intermediate position, at which the vehicle is still a safe distance from a surrounding object and, starting from the second intermediate position, comprises planning an S-shaped parking movement or a parking movement comprising a circular arc and a clothoid to the current position of the vehicle;

verifying whether the new planning by at least one of the first or the second planning method allowed an admissible new parking trajectory between the current vehicle position and the target position of the vehicle within specified parking limits; and controlling the vehicle to operate according to the admissible new parking trajectory.

* * * * *